United States Patent
Liu et al.

(10) Patent No.: US 9,251,567 B1
(45) Date of Patent: Feb. 2, 2016

(54) PROVIDING COLOR CORRECTIONS TO PHOTOS

(71) Applicant: Google Inc., Mountain View, CA (US)

(72) Inventors: Tinglin Liu, Mountain View, CA (US); Stephen Joseph Diverdi, Oakland, CA (US); Aravind Krishnaswamy, San Jose, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/209,253

(22) Filed: Mar. 13, 2014

(51) Int. Cl.
*G06T 5/00* (2006.01)
*G06K 9/00* (2006.01)
*G06T 7/40* (2006.01)

(52) U.S. Cl.
CPC .............. *G06T 5/00* (2013.01); *G06K 9/00288* (2013.01); *G06T 7/408* (2013.01)

(58) Field of Classification Search
None
See application file for complete search history.

(56) References Cited

U.S. PATENT DOCUMENTS

| | | | |
|---|---|---|---|
| 8,175,382 B2 | 5/2012 | Liu et al. | |
| 8,457,394 B2 | 6/2013 | Do et al. | |
| 8,750,609 B2* | 6/2014 | Iguchi et al. | 382/167 |
| 2002/0150291 A1* | 10/2002 | Naf et al. | 382/162 |
| 2008/0273766 A1* | 11/2008 | Kim et al. | 382/118 |
| 2009/0034837 A1* | 2/2009 | Kato et al. | 382/167 |
| 2009/0245603 A1* | 10/2009 | Koruga et al. | 382/128 |
| 2012/0045095 A1 | 2/2012 | Tate et al. | |
| 2013/0027569 A1* | 1/2013 | Parulski | 348/207.1 |
| 2013/0083969 A1 | 4/2013 | Tsukada | |

OTHER PUBLICATIONS

Kryszczuk et al, Color correction for face detection based on human visual perception metaphor, 2003, Proc. of the Workshop on Multimodal User Authentication, pp. 1-6.*
Yang et al, Skin-color modeling and adaptation, 1997, Springer Berlin Heidelberg, pp. 1-21.*
Martinkauppi et al, Facial skin color modeling, 2005, Handbook of face recognition, Springer New York, pp. 113-135.*

* cited by examiner

*Primary Examiner* — Bhavesh Mehta
*Assistant Examiner* — David F Dunphy
(74) *Attorney, Agent, or Firm* — IP Spring (57) ABSTRACT

Implementations generally relate to color corrections to photos. In some implementations, a method includes determining a face profile from a plurality of photos of a face. The method further includes receiving a target photo of the face. The method further includes matching the face in the target photo with the face in the plurality of photos. The method further includes performing one or more color adjustments to the face in the target photo based on the face profile.

16 Claims, 4 Drawing Sheets

PROVIDING COLOR CORRECTIONS TO PHOTOS

BACKGROUND

The popularity and convenience of digital cameras as well as the widespread of use of Internet communications have caused user-produced images such as photographs to become ubiquitous. Image editing systems for various consumer electronic devices and personal computers enable a user to manipulate images. Digital cameras typically apply a white balance correction to photos, which is often inaccurate. Users can manually correct the white balance correction if the digital camera correction is inaccurate.

SUMMARY

Implementations generally relate to color corrections to photos. In some implementations, a method includes determining a face profile from a plurality of photos of a face. The method further includes receiving a target photo of the face. The method further includes matching the face in the target photo with the face in the plurality of photos. The method further includes performing one or more color adjustments to the face in the target photo based on the face profile.

With further regard to the method, in some implementations, the determining of the face profile includes generating a model of the face from the plurality of photos, and generating the face profile based on the model. In some implementations, the model is a Gaussian model. In some implementations, the determining of the face profile includes generating a model of the face from the plurality of photos, where the model is a Gaussian model, and generating the face profile based on the Gaussian model. In some implementations, the generating of the model of the face includes determining color dimensions and an illumination dimension associated with the face, and generating a model of the face based on the color dimensions. In some implementations, the matching includes applying a face detection algorithm to detect the face in the target photo, and applying a facial recognition algorithm to match the face in the target photo with the face in the plurality of photos. In some implementations, the performing of the one or more color adjustments includes extracting a skin color from the target photo, comparing the skin color to the face profile, and adjusting the skin color based on the face profile. In some implementations, the performing of one or more color adjustments includes extracting a skin color from the target photo, comparing the skin color from the target photo to the skin color from the face profile, and adjusting the skin color based on the face profile by decreasing differences between skin color from the target photo and the skin color from the face profile. In some implementations, the method further includes extracting a skin color from the target photo, generating a model of the face of the target photo based on the extracted skin color, and updating the model of the face in the plurality of photos with the model of the face of the target photo.

In some implementations, a method includes determining a face profile from a plurality of photos of a face, where the determining of the face profile includes generating a model of the face from the plurality of photos, and generating the face profile based on the model. The method further includes receiving a target photo of the face, matching the face in the target photo with the face in the plurality of photos, and performing one or more color adjustments to the face in the target photo based on the face profile. The performing of the one or more color adjustments includes adjusting a skin color based on the face profile.

With further regard to the method, in some implementations, the model is a Gaussian model. In some implementations, the generating of the model of the face includes determining color dimensions and an illumination dimension associated with the face, and generating the model of the face based on the color dimensions. In some implementations, the performing of the one or more color adjustments includes extracting the skin color from the target photo, comparing the skin color to skin color from the face profile, and adjusting the skin color based on the face profile.

In some implementations, a system includes one or more processors, and logic encoded in one or more tangible media for execution by the one or more processors. When executed, the logic is operable to perform operations including: determining a face profile from a plurality of photos of a face; receiving a target photo of the face; matching the face in the target photo with the face in the plurality of photos; and performing one or more color adjustments to the face in the target photo based on the face profile.

With further regard to the system, in some implementations, to determine the face profile, the logic when executed is further operable to perform operations including generating a model of the face from the plurality of photos, and generating the face profile based on the model. In some implementations, the model is a Gaussian model. In some implementations, to determine the face profile, the logic when executed is further operable to perform operations including generating a model of the face from the plurality of photos, where the model is a Gaussian model, and generating the face profile based on the Gaussian model. In some implementations, to generate the model of the face, the logic when executed is further operable to perform operations including determining color dimensions and an illumination dimension associated with the face, and generating a model of the face based on the color dimensions. In some implementations, to match the face in the target photo, the logic when executed is further operable to perform operations including applying a face detection algorithm to detect the face in the target photo, and applying a facial recognition algorithm to match the face in the target photo with the face in the plurality of photos. In some implementations, to perform the one or more color adjustments, the logic when executed is further operable to perform operations including extracting a skin color from the target photo, comparing the skin color to the face profile, and adjusting the skin color based on the face profile.

DETAILED DESCRIPTION

Implementations described herein provide color corrections in photos. In various implementations, a system determines a face profile from photos of a face. Users may be able to specify and/or consent to the use of their personal information, which may include using their faces in images or using their identity information in recognizing people identified in images. In various implementations, the face is the face of the same person. For example, the photos may be of the same person in different environments such as indoors in different lighting conditions, and/or outdoors in different lighting conditions. As described in more detail below, in some implementations, to determine the face profile, the system generates a model of the face from the plurality of photos, and then generates the face profile based on the model. In some implementations, the model is a Gaussian model, where the system generates the face profile based on the Gaussian model. In some implementations, to determine the face profile, the system determines color dimensions and an illumination dimension associated with the face, and then generates the model of the face based on the color dimensions.

In various implementations, the system receives a target photo of the face. The system then matches the face in the target photo with the face in the plurality of photos. The system then performs one or more color adjustments to the face in the target photo based on the face profile. In some implementations, to perform the one or more color adjustments, the system extracts a skin color from the target photo, compares the skin color to skin color from the face profile, and then adjusts the skin color based on the face profile.

Figure 1:
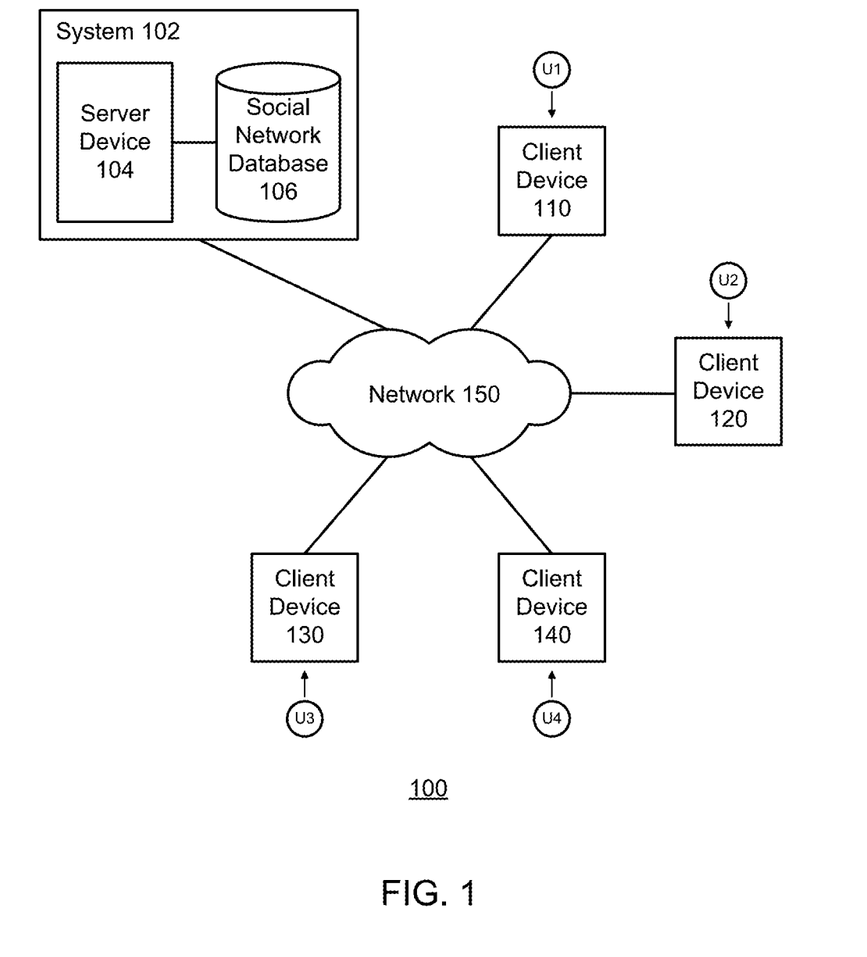
FIG. 1 illustrates a block diagram of an example network environment, which may be used to implement the implementations described herein.

FIG. 1 illustrates a block diagram of an example network environment 100, which may be used to implement the implementations described herein. In some implementations, network environment 100 includes a system 102, which includes a server device 104 and a social network database 106. In various implementations, the term system 102 and phrase "social network system" may be used interchangeably. Network environment 100 also includes client devices 110, 120, 130, and 140, which may communicate with each other via system 102. Network environment 100 also includes a network 150.

For ease of illustration, FIG. 1 shows one block for each of system 102, server device 104, and social network database 106, and shows four blocks for client devices 110, 120, 130, and 140. Blocks 102, 104, and 106 may represent multiple systems, server devices, and social network databases. Also, there may be any number of client devices. In other implementations, network environment 100 may not have all of the components shown and/or may have other elements including other types of elements instead of, or in addition to, those shown herein.

In various implementations, users U1, U2, U3, and U4 may communicate with each other using respective client devices 110, 120, 130, and 140. For example, users U1, U2, U3, and U4 may share photos with each other in a social network system, where respective client devices 110, 120, 130, and 140 transmit photos to each other via system 102.

In the various implementations described herein, processor of system 102 causes the elements described herein (e.g., photos, etc.) to be displayed in a user interface on one or more display screens.

In various implementations, system 102 may utilize a recognition algorithm to determine to match the face of a given person in different photos. System 102 enables user to specify and/or consent to using their faces in images or using their identity information in recognizing people identified in images._Example implementations of recognition algorithms are described in more detail below.

While some implementations are described herein in the context of a social network system, these implementations may apply in contexts other than a social network. For example, implementations may apply locally for an individual user. For example, system 102 may perform the implementations described herein on a stand-alone computer, tablet computer, smartphone, etc.

Figure 2:
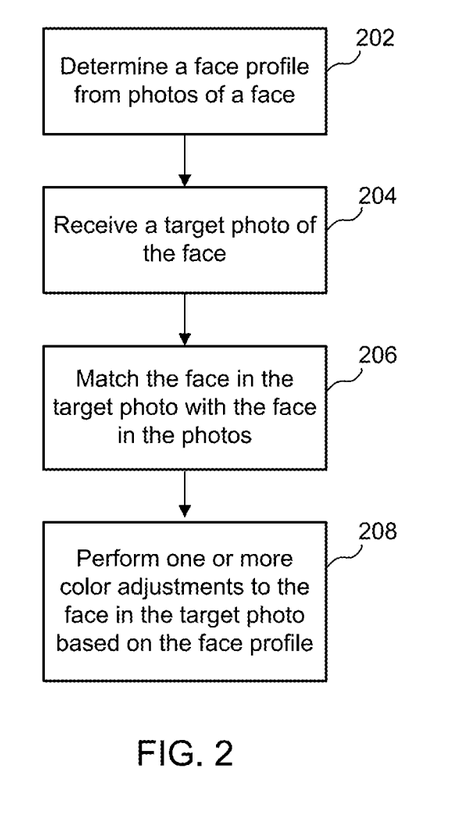
FIG. 2 illustrates an example simplified flow diagram for providing color corrections to photos, according to some implementations.

FIG. 2 illustrates an example simplified flow diagram for providing color corrections to photos, according to some implementations. Referring to both FIGS. 1 and 2, a method is initiated in block 202, where system 102 determines a face profile from photos of a face. As indicated above, in various implementations, the face is the face of the same person. For example, the photos may be of the same person in different environments such as indoors in different lighting conditions, and/or outdoors in different lighting conditions.

System 102 enables user to specify and/or consent to using their faces in images or using their identity information in recognizing people identified in images. For example, system 102 may provide users with multiple selections directed to specifying and/or consenting to the use of personal information._In various implementations, system 102 applies a facial recognition algorithm to match the face in each photo with the same face in the other photos. This ensures that the face in the different photos is the face of the same person. Various example implementations directed to facial recognition algorithms are described in more detail below. System 102 may also search and locate photos of the same user based on tags of the user in photos.

In some implementations, when determining the face profile, system 102 generates a model of the face from the photos, and then generates the face profile based on the model. In some implementations, when generating a model of the face, system 102 determines color dimensions and an illumination dimension associated with the face, and generates the model of the face based on the color dimensions. In some implementations, the model is a Gaussian model. As such, in some implementations, system 102 generates the face profile based on the Gaussian model.

In various implementations, the face profile is a canonical face color profile in that it includes represents the actual color of the person's face. In some implementations, the face profile describes the statistics of the face skin tone distributions over multiple photos of the person. In various implementations, system 102 builds the face profile multiple images in a variety of lighting conditions (e.g., indoors in different lighting conditions, outdoors in different lighting conditions, etc.), and the face profile represents the actual color of the person's face. System 102 builds up the face profile over many images. This statistically results in the average face profile for the person. Even if a new photo comes in that has a slightly different color, the new photo will not change the face profile picture too much, and the face profile can be used to correct the new image that came in.

As described in more detail below, in some implementations, system 102 generates for each face profile several models of different distributions and different statistics of face skin samples in different illuminations. In some implementations, these models are Gaussian models, and system 102 stores estimates of these Gaussian models under multiple illuminance levels. As a result, system 102 stores a definitive color along with different illuminance values in the face profile.

As described in more detail below, in various implementations, the face profile includes color values and illuminance values, where the illuminance values are separate from the color values. In some implementations, system 102 may store face profiles in a modified colorspace, where the colorspace is an xzY colorspace, where the xz components correspond to color values, and the Y component corresponds to illuminance values.

In various implementations, system 102 generates a transformation of just the xz components, and leaving the Y component alone. This preserves the illumination in the scene while correcting just the colors that are off. In some implementations, system 102 may also use the Y component difference to fix images where the exposure is off.

In various implementations, system 102 derives the xzY components from an sRGB colorspace. The sRGB colorspace provides all colors from the combination of red, green and blue colors. System 102 separates the chrominance and color components from the illuminance component. In various implementations, system 102 may perform this transformation with a CIEXYZ colorspace in order to obtain luminance, and color or chrominance data.

In some implementations, the conversion from sRGB colorspace to xzY colorspace (sRGB→xzY) involves three steps: sRGB→LinearRGB→XYZ→xzY.

The first two steps convert sRGB to XYZ, which is may be performed using any suitable algorithm. In various implementations, final step that converts XYZ to the xzY colorspace is derived from by:

x in xzY=X/Y in XYZ;
z in xzY=Z/Y in XYZ; and
Y in xzY=Y in XYZ.

In various implementations, x,z channels in xzY are normalized X,Z channels in XYZ, and system 102 keeps the value of Y channel untouched.

In some implementations, system 102 may perform a reverse conversion from the xzY colorspace to the sRGB colorspace (xzY→sRGB). This also involves three steps: xzY→XYZ→LinearRGB→sRGB.

The last two steps from XYZ to sRGB may be performed using any suitable algorithm. In some implementations, system 102 may compute the XYZ from xzY colorspace by:

X in XYZ=x*Yin xzY;
Y in XYZ=Y in xzY; and
Z in XYZ=z*Y in xzY.

In some implementations, the xzY colorspace generated by system 102 is a modification of the CIEXYZ colorspace, where, in the xzY colorspace, system 102 normalizes the luminance. The xzY colorspace avoids luminance shifts that occur in an unmodified CIEXYZ colorspace. In various implementations, system 102 generates the XZY colorspace directly from the RBG colorspace.

In some implementations, system 102 provides a predetermined number (e.g., five, etc.) of illuminance levels and corresponding Gaussian models (e.g., five Gaussian models, etc.), where there is one Gaussian model for each illuminance level. In some implementations, each Gaussian model is made up of a mean and standard deviation for each of the x and z axes. As such, the face profile indicates for each of the different luminance bands what the mean and the standard deviation for x and z are.

In some implementations, the Gaussian model is an independent Gaussian model. For example, in the independent Gaussian model, the xz channels are independent in that they have no correlation. By being an independent Gaussian model, system 102 is able to compute the scales in both x and z dimensions, which can be applied to the whole image.

In various implementations, system 102 enables users of the social network system to specify and/or consent to the use of personal information. For example, selections with regard to specifying and/or consenting may be associated with individual images. The selections may be implemented in a variety of ways. For example, system 102 may cause buttons or check boxes to be displayed next to various selections. In various implementations, whenever a photo is uploaded, system 102 will either identify a face based on a face detection algorithm or based on a tag in the photo. System 102 then determines a face box and extracts the skin color/pixels of the face in the face box (e.g., a region in the photo that frames the face). System 102 then constructs an estimate for the skin color for that image. In particular, system 102 converts the pixel information into a Gaussian model, which can then be added to that person's face profile, which system 102 builds and maintains for the individual user. As described in more detail below, once added, system 102 may then use the face profile to make necessary adjustments to the photos. In various implementations, system 102 generates for each user a unique canonical face color profile, and updates the face profile incrementally from the uploaded photos.

In various implementations, system 102 receives the photos from one or more users. In various implementations, the photos may be received when a given user uploads the photos to system 102 or after the user adds the photos to one or more photo albums. In some implementations, system 102 may enable a camera device (e.g., smart phone) of the user to automatically upload photos to system 102 as the camera device captures photos.

Referring still to FIG. 2, in block 204, system 102 receives a target photo of the face. Similar to the other photos of the same face, system 102 receives the photos from one or more users (e.g., received when the photo is uploaded to system 102, manually, automatically, etc.).

In block 206, system 102 matches the face in the target photo with the face in the photos. In some implementations, when matching a face in the target photo with the face in the photos, system 102 may apply a face detection algorithm to detect the face in the target photo. System 102 enables users of the social network system to specify and/or consent to the use of personal information. System 102 may then apply a facial recognition algorithm to match the face in the target photo with the face in the plurality of photos. Various example implementations directed to facial recognition algorithms are described in more detail below.

In block 208, system 102 performs one or more color adjustments to the face in the target photo based on the face profile. In various implementations, when performing the one or more color adjustments to the face in the target photo, system 102 adjusts the skin color of the target face based on the face profile. For example, in some implementations, system 102 may extract the skin color from the target photo. More particularly, system 102 may determine a face box. System 102 may then extract the skin pixels of the face in the face box.

System 102 then compares the skin color from the target photo to the skin color of the face profile. In particular, in some implementations, system 102 compares the skin tone distributions in the target photo with the canonical distributions in the face profile.

System 102 enhances the photo, where system 102 adjusts the skin color based on the face profile. In some implementations, system 102 adjusts the skin color based on the face profile by decreasing differences between skin color from the target photo and the skin color from the face profile. As a result, the color corrections are specific to the face of a given individual in a photo. This process of system 102 removes any wrong color casts and makes photos or portraits more natural.

In various implementations, while the color corrections is applied to the face of a given person in a photo, the same color corrections may also be applied to the rest of the elements in the photo. In other words, by using a known skin tone such as a face as a reference, system 102 automatically adjusts/corrects white balance, and enhances the colors of other elements in addition to the face in the photo.

Implementations achieve better color corrections than conventional solutions, because of the use of accurate face models. Although the skin tones among different people appear quite different, the skin tone of each individual will almost always be stable. Implementations provide a canonical face color profile that is comprehensive, because implementations have taken into consideration the differences of skin tone appearances in different lighting situations. Implementations adaptively model the skin tone distributions in different illuminance conditions, such as in-door, under sunshine, etc.

As indicated above, in some implementations, system 102 stores face profiles in a modified colorspace, where the colorspace is an xzY colorspace, where the xz components correspond to color values, and the Y component corresponds to illuminance values.

Implementations achieve better color corrections than conventional solutions, because of the colorspace manipulations. For example, implementations manipulate an xzY colorspace that is derived from an XYZ colorspace, where system 102 separates the illuminance and chromaticity of the color. As such, the color correction can focus on the color bias leaving the brightness of the photo untouched. Performance is enhanced, because the color corrections de-correlate the illuminance and chromaticity components of the color, instead of directly manipulating the red, green, blue channels. Implementations utilize algorithms that are fast and computationally efficient.

As indicated above, system 102 may extract the skin color from the target photo, and then generate a model of the face of the target photo based on the extracted skin color. In some implementations, system 102 may update the model of the face of the plurality of photos with the model of the face of the target photo.

While conventional color correcting solutions provide color balance operations using red, green, and blue channel pixel values without respect to any color sensing, implementations described herein provide color correcting while considering color sensing such as illuminance and chromaticity.

Figure 3:
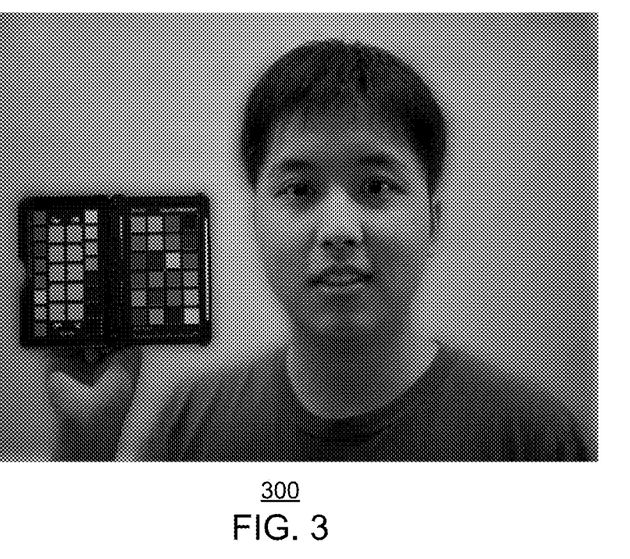
FIG. 3 illustrates an example photo before color corrections are applied, according to some implementations.
Figure 4:
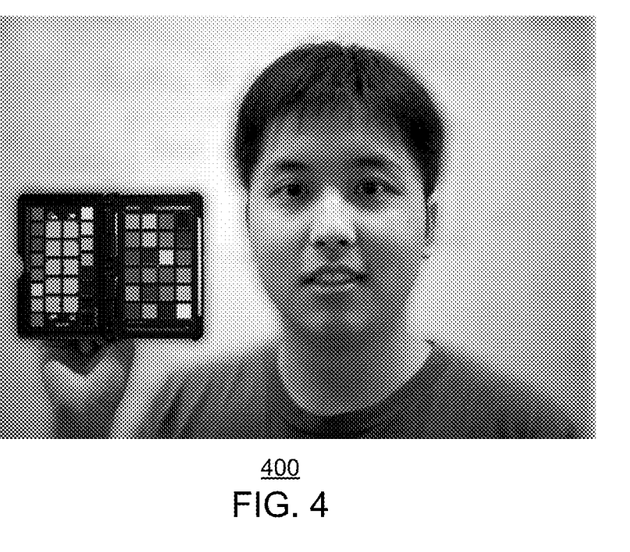
FIG. 4 illustrates an example photo after color corrections are applied, according to some implementations.

FIG. 3 illustrates an example photo 300 before color corrections are applied, according to some implementations. FIG. 4 illustrates an example photo 400 after color corrections are applied, according to some implementations. While the example photos 300 and 400 are shown in grayscale, the different shades represent different tones of color.

Referring to FIG. 3, when the photo is captured under fluorescent illumination, the white balancing can be off. The image, for example, can have a green or yellow tint to it. In other lighting conditions such as incandescent light for example, the image can have an orange or red tint to it.

Referring to FIG. 4, after system 102 performs one or more color adjustments to the face in the photo, the white balance is corrected, thereby bring it to more of a pure white, and the colors are no longer tainted or incorrectly tinted. As shown, in various implementations, while the color corrections are applied to the face of the person in a photo, the same color corrections are also applied to the rest of the elements in the photo.

In some implementations, system 102 has built-in safety mechanisms that take into account anomalies to a given face in photos. For example, if a given face has makeup on (e.g., a painted blue streak), system 102 may avoid polluting the profile with that kind of extraneous data by ignoring the anomalous portions. System 102 may determine the distance between the color of the portion of the face to the colors of human skin hues, and discards portions (e.g., pixels) that are too far off out of range. System 102 may use a mask to discard those pixels or in some instances all of the pixels of the entire face depending on the scenario. System 102 may treat such portions of the face similarly to other portions such as eyes, facial hair, eye glasses, etc.

While implementation herein are described in the context of faces in photos, these implementations and others may also apply to video (e.g., still frames of a video).

For ease of illustration, some implementations are described herein in the context of applying color corrections to a single face in a photo. These implementations and others also apply to multiple faces in a single photo. For example, in some implementations, if a given photos has three faces in it. System 102 may apply various implementations described herein on each face separately.

Implementations described herein provide various benefits. For example, color corrections are specific to the face of a given individual in a photo. Implementations also take into account different lighting conditions of the photo. The system automatically corrects for white balance for instead being manually corrected by the user.

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

While system 102 is described as performing the steps as described in the implementations herein, any suitable component or combination of components of system 102 or any suitable processor or processors associated with system 102 may perform the steps described.

In various implementations, system 102 may utilize a variety of recognition algorithms to recognize faces, landmarks, objects, etc. in images. Such recognition algorithms may be integral to system 102. System 102 may also access recognition algorithms provided by software that is external to system 102 and that system 102 accesses.

In various implementations, system 102 enables users of the social network system to specify and/or consent to the use of personal information, which may include system 102 using their faces in images or using their identity information in recognizing people identified in images. For example, system 102 may provide users with multiple selections directed to specifying and/or consenting to the use of personal information. For example, selections with regard to specifying and/or consenting may be associated with individual images, all images, individual photo albums, all photo albums, etc. The selections may be implemented in a variety of ways. For example, system 102 may cause buttons or check boxes to be displayed next to various selections. In some implementations, system 102 enables users of the social network to specify and/or consent to the use of using their images for facial recognition in general. Example implementations for recognizing faces and other objects are described in more detail below.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

In situations in which the systems discussed here collect personal information about users, or may make use of personal information, the users may be provided with an opportunity to control whether programs or features collect user information. In various implementations, system 102 obtains reference images of users of the social network system, where each reference image includes an image of a face that is associated with a known user. The user is known, in that system 102 has the user's identity information such as the user's name and other profile information. In some implementations, a reference image may be, for example, a profile image that the user has uploaded. In some implementations, a reference image may be based on a composite of a group of reference images.

In some implementations, to recognize a face in an image, system 102 may compare the face (e.g., image of the face) and match the face to reference images of users of the social network system. In various implementations, system 102 enables users of the social network system to specify and/or consent to the use of personal information, which may include system 102 using their faces in images or using their identity information in recognizing people identified in images. Note that the term "face" and the phrase "image of the face" are used interchangeably. For ease of illustration, the recognition of one face is described in some of the example implementations described herein. These implementations may also apply to each face of multiple faces to be recognized.

In some implementations, system 102 may search reference images in order to identify any one or more reference images that are similar to the face in the image. In some implementations, for a given reference image, system 102 may extract features from the image of the face in an image for analysis, and then compare those features to those of one or more reference images. For example, system 102 may analyze the relative position, size, and/or shape of facial features such as eyes, nose, cheekbones, mouth, jaw, etc. In some implementations, system 102 may use data gathered from the analysis to match the face in the image to one more reference images with matching or similar features. In some implementations, system 102 may normalize multiple reference images, and compress face data from those images into a composite representation having information (e.g., facial feature data), and then compare the face in the image to the composite representation for facial recognition.

In some scenarios, the face in the image may be similar to multiple reference images associated with the same user. As such, there would be a high probability that the person associated with the face in the image is the same person associated with the reference images.

In some scenarios, the face in the image may be similar to multiple reference images associated with different users. As such, there would be a moderately high yet decreased probability that the person in the image matches any given person associated with the reference images. To handle such a situation, system 102 may use various types of facial recognition algorithms to narrow the possibilities, ideally down to one best candidate. In various implementations, system 102 enables users of the social network system to specify and/or consent to the use of personal information, which may include system 102 using their faces in images or using their identity information in recognizing people identified in images.

For example, in some implementations, to facilitate in facial recognition, system 102 may use geometric facial recognition algorithms, which are based on feature discrimination. System 102 may also use photometric algorithms, which are based on a statistical approach that distills a facial feature into values for comparison. A combination of the geometric and photometric approaches could also be used when comparing the face in the image to one or more references.

Other facial recognition algorithms may be used. For example, system 102 may use facial recognition algorithms that use one or more of principal component analysis, linear discriminate analysis, elastic bunch graph matching, hidden Markov models, and dynamic link matching. It will be appreciated that system 102 may use other known or later developed facial recognition algorithms, techniques, and/or systems.

In some implementations, system 102 may generate an output indicating a likelihood (or probability) that the face in the image matches a given reference image. In some implementations, the output may be represented as a metric (or numerical value) such as a percentage associated with the confidence that the face in the image matches a given reference image. For example, a value of 1.0 may represent 100% confidence of a match. This could occur, for example, when compared images are identical or nearly identical. The value could be lower, for example 0.5 when there is a 50% chance of a match. Other types of outputs are possible. For example, in some implementations, the output may be a confidence score for matching.

Figure 5:
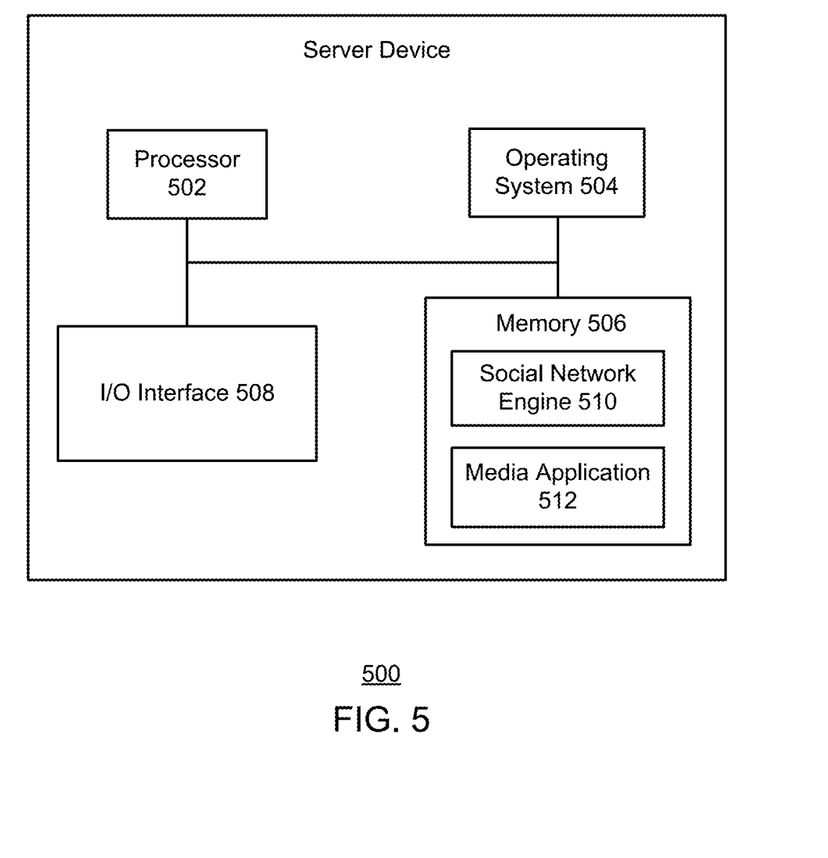
FIG. 5 illustrates a block diagram of an example server device, which may be used to implement the implementations described herein.

FIG. 5 illustrates a block diagram of an example server device 500, which may be used to implement the implementations described herein. For example, server device 500 may be used to implement server device 104 of FIG. 1, as well as to perform the method implementations described herein. In some implementations, server device 500 includes a processor 502, an operating system 504, a memory 506, and an input/output (I/O) interface 508. Server device 500 also includes a social network engine 510 and a media application 512, which may be stored in memory 506 or on any other suitable storage location or computer-readable medium. Media application 512 provides instructions that enable processor 502 to perform the functions described herein and other functions.

For ease of illustration, FIG. 5 shows one block for each of processor 502, operating system 504, memory 506, I/O interface 508, social network engine 510, and media application 512. These blocks 502, 504, 506, 508, 510, and 512 may represent multiple processors, operating systems, memories, I/O interfaces, social network engines, and media applications. In other implementations, server device 500 may not have all of the components shown and/or may have other elements including other types of elements instead of, or in addition to, those shown herein.

Although the description has been described with respect to particular embodiments thereof, these particular embodiments are merely illustrative, and not restrictive. Concepts illustrated in the examples may be applied to other examples and implementations. For example, some implementations are described herein in the context of a social network system.

However, the implementations described herein may apply in contexts other than a social network. For example, implementations may apply locally for an individual user.

Note that the functional blocks, methods, devices, and systems described in the present disclosure may be integrated or divided into different combinations of systems, devices, and functional blocks as would be known to those skilled in the art.

Any suitable programming languages and programming techniques may be used to implement the routines of particular embodiments. Different programming techniques may be employed such as procedural or object-oriented. The routines may execute on a single processing device or multiple processors. Although the steps, operations, or computations may be presented in a specific order, the order may be changed in different particular embodiments. In some particular embodiments, multiple steps shown as sequential in this specification may be performed at the same time.

A "processor" includes any suitable hardware and/or software system, mechanism or component that processes data, signals or other information. A processor may include a system with a general-purpose central processing unit, multiple processing units, dedicated circuitry for achieving functionality, or other systems. Processing need not be limited to a geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory. The memory may be any suitable data storage, memory and/or non-transitory computer-readable storage medium, including electronic storage devices such as random-access memory (RAM), read-only memory (ROM), magnetic storage device (hard disk drive or the like), flash, optical storage device (CD, DVD or the like), magnetic or optical disk, or other tangible media suitable for storing instructions for execution by the processor. The software instructions can also be contained in, and provided as, an electronic signal, for example in the form of software as a service (SaaS) delivered from a server (e.g., a distributed system and/or a cloud computing system).

What is claimed is:

1. A method comprising:
   determining a face profile of a face, wherein the determining of the face profile comprises:
      generating a model of the face from a plurality of photos, wherein the plurality of photos includes the face in a variety of lighting conditions, and wherein the model of the face is based on face skin color distributions over the plurality of photos of the face; and
      generating the face profile based on the model;
   receiving a target photo of the face;
   matching the face in the target photo with the face in the plurality of photos associated with the face profile; and
   performing one or more color adjustments to the face in the target photo based on the face profile, wherein the performing of the one or more color adjustments comprises decreasing a difference between a first skin color associated with the target photo and a second skin color associated with the face profile.

2. The method of claim 1, wherein the plurality of photos includes the face in one or more indoor environments.

3. The method of claim 1, wherein the plurality of photos includes the face in one or more outdoor environments.

4. The method of claim 1, wherein the model is a Gaussian model, and wherein the generating of the face profile is based on the Gaussian model.

5. The method of claim 1, wherein the generating of the model of the face comprises:
   determining one or more color dimensions and one or more illumination dimensions associated with the face; and
   generating the model of the face based on one or more of the one or more color dimensions and the one or more illumination dimensions.

6. The method of claim 1, wherein the face profile includes one or more of color values and illuminance values.

7. The method of claim 1, wherein the performing of the one or more color adjustments comprises:
   extracting a skin color of the face in the target photo;
   comparing the skin color of the face in the target photo to a skin color from the face profile; and
   adjusting the skin color of the face in the target photo based on the comparison.

8. The method of claim 1, wherein the performing of the one or more color adjustments comprises:
   extracting a skin color of the face in the target photo;
   comparing the skin color of the face in the target photo to a skin color from the face profile; and
   adjusting the skin color of the face in the target photo based on the comparison.

9. The method of claim 1, further comprising:
   extracting a skin color of the face in the target photo;
   generating the model of the face in the target photo based on the extracted skin color; and
   updating the model of the face in the plurality of photos with the model of the face in the target photo.

10. A system comprising:
    one or more processors; and
    logic encoded in one or more tangible media for execution by the one or more processors and when executed operable to perform operations comprising:
       determining a face profile of a face, wherein the determining of the face profile comprises:
          generating a model of the face from a plurality of photos, wherein the plurality of photos includes the face in a variety of lighting conditions, and wherein the model of the face is based on face skin color distributions over the plurality of photos of the face; and
          generating the face profile based on the model;
       receiving a target photo of the face;
       matching the face in the target photo with the face in the plurality of photos; and
       performing one or more color adjustments to the face in the target photo based on the face profile, wherein the performing of the one or more color adjustments comprises decreasing a difference between a first skin color associated with the target photo and a second skin color associated with the face profile.

11. The system of claim 10, wherein the plurality of photos includes the face in one or more indoor environments.

12. The system of claim 10, wherein the plurality of photos includes the face in one or more outdoor environments.

13. The system of claim 10, wherein the model is a Gaussian model, and wherein the generating of the face profile is based on the Gaussian model.

14. The system of claim 10, wherein to generate the model of the face, the logic when executed is further operable to perform operations comprising:
    determining one or more color dimensions and one or more illumination dimensions associated with the face; and generating a model of the face based on one or more of the one or more color dimensions and the one or more illumination dimensions.

15. The system of claim 10, wherein the face profile includes one or more of color values and illuminance values.

16. The system of claim 10, wherein to perform the one or more color adjustments, the logic when executed is further operable to perform operations comprising:
   extracting a skin color of the face in the target photo;
   comparing the skin color to the face profile; and
   adjusting the skin color of the face in the target photo based on the comparison.

* * * * *